United States Patent [19]

Stranders

[11] Patent Number: 5,333,347
[45] Date of Patent: Aug. 2, 1994

[54] DEVICE FOR CLEANING THE INNER SURFACES OF THE FRONT AND REAR WINDOWS OF AUTOMOBILES

[76] Inventor: Rolf Stranders, Kirchweg 39, CH-8102 Oberengstringen, Switzerland

[21] Appl. No.: 962,805
[22] PCT Filed: Apr. 22, 1992
[86] PCT No.: PCT/CH92/00077
 § 371 Date: Dec. 23, 1992
 § 102(e) Date: Dec. 23, 1992
[87] PCT Pub. No.: WO92/19142
 PCT Pub. Date: Nov. 12, 1992

[30] Foreign Application Priority Data
Apr. 24, 1991 [CH] Switzerland .......... 1231/91

[51] Int. Cl.5 .................. A47L 1/06
[52] U.S. Cl. ............. 15/220.1; 15/144.2; 15/210.1; 15/228; 15/232
[58] Field of Search ........ 15/143.1, 184, 210.1, 15/220.1, 228, 244.1, 144.2, 147.2, 231, 232

[56] References Cited

U.S. PATENT DOCUMENTS

| | | |
|---|---|---|
| 825,400 | 7/1906 | Lightbrown .......... 15/231 |
| 1,121,082 | 12/1914 | Farrar .......... 15/184 |
| 2,291,435 | 7/1942 | Anderson .......... 15/220.1 |
| 2,440,014 | 4/1948 | Ludwick . |
| 2,682,071 | 6/1954 | Linderoth .......... 15/228 |
| 3,121,899 | 2/1964 | Lindmark .......... 15/143.1 |
| 3,339,220 | 9/1967 | Barry . |
| 3,380,099 | 4/1968 | Hunt .......... 15/210.1 |
| 3,403,420 | 10/1968 | MacLaughlin . |
| 3,420,581 | 1/1969 | Richardson . |
| 3,485,502 | 12/1969 | Thornton .......... 15/210.1 |
| 3,649,987 | 3/1972 | Tomingas et al. . |
| 3,713,744 | 1/1973 | Sims .......... 15/210.1 |
| 3,737,938 | 6/1973 | Saltzstein .......... 15/210.1 |
| 3,983,595 | 10/1976 | Knudsen et al. . |
| 4,219,899 | 9/1980 | Zurawin et al. . |
| 4,475,262 | 10/1984 | Downer .......... 15/144.2 |
| 4,685,167 | 8/1987 | Murray . |
| 4,720,888 | 1/1988 | Menz . |
| 4,769,869 | 9/1988 | Benitez . |
| 4,845,800 | 7/1989 | Pederson et al. . |
| 4,852,210 | 8/1989 | Krajicek . |
| 4,976,000 | 12/1990 | Wiley . |
| 4,996,735 | 3/1991 | Blankenship .......... 15/210.1 |
| 5,042,105 | 8/1991 | Buck et al. . |
| 5,140,717 | 8/1992 | Castagliola .......... 15/210.1 |
| 5,159,735 | 11/1992 | Owens .......... 15/210.1 |
| 8,502,667 | 2/1976 | Thielen .......... 15/228 |

FOREIGN PATENT DOCUMENTS

| | | |
|---|---|---|
| 2645188 | 4/1976 | Fed. Rep. of Germany . |
| 3108023 | 9/1982 | Fed. Rep. of Germany . |
| 8709765 | 10/1987 | Fed. Rep. of Germany . |
| 9000477 | 8/1990 | Fed. Rep. of Germany . |
| 6708504 | 12/1968 | Netherlands .......... 15/210.1 |
| 8601378 | 1/1987 | Netherlands . |
| 8912419 | 12/1989 | PCT Int'l Appl. . |

Primary Examiner—Timothy F. Simone
Assistant Examiner—Randall E. Chin
Attorney, Agent, or Firm—Speckman, Pauley & Fejer

[57] ABSTRACT

A device for cleaning the inner surfaces of the front and rear windows of automobiles, said device having a cleaning part connected to a handle, the angle of inclination of the cleaning part relative to the handle being freely adjustable by way of an exchangeable knuckle joint without altering the angle of rotation of the cleaning part relative to the longitudinal axis of the handle. The cleaning part is arched, ensuring uniform, flat cleaning of the inner surfaces of the automobile windows.

8 Claims, 2 Drawing Sheets

DEVICE FOR CLEANING THE INNER SURFACES OF THE FRONT AND REAR WINDOWS OF AUTOMOBILES

BACKGROUND OF THE INVENTION

1. Field of the Invention

This invention relates to an apparatus for cleaning the inner surfaces of the front and rear windows of automobiles.

2. Description of the Prior Art

Numerous scrapers and wipers for cleaning the exterior surfaces of automobile windows are known. They consist of a handle and a cleaning part fixedly connected thereto, for example a scraper, wiper blade or foam rubber strip, or combinations thereof.

In most cases, such cleaning devices must be capable of removing dirt, caked on the exterior surface of the window, by exerting a mechanical force and subsequently drying the cleaned, wet window. It is accordingly necessary to be able to exert a directed force effect on the cleaning part through the handle in order to be able to achieve a directed scraping action. Based on these considerations, the connection between the handle and the cleaning part is provided as a rigid one.

None of these considerations are valid in regard to cleaning the insides of the automobile windows. Here, no great pointed or linear pressure is required, only a flat, steady, but reduced pressure. Accordingly, the cleaning part should not be rigid per se, but flexible, and the connection between the handle and the cleaning part should be as movable as possible. Only in this way is it possible to clean the concavely-shaped and extremely hard to reach inside surfaces of automobile windows.

SUMMARY OF THE INVENTION

Based on the above considerations and experiences, a device for cleaning the inside surfaces of the windshield and rear window of an automobile having a cleaning part disposed on a handle, the cleaning part in the form of a plate which is connected with means for the removable connection of an exchangeable knuckle joint to the handle has been developed which eliminates the disadvantages of known devices and is particularly suited for cleaning the inside surfaces of automobile windows.

In accordance with one embodiment of this invention, the plate is curved such that its contact surface has a concave, cylindrical bend, the axis of curvature of which extends perpendicular to the longitudinal axis of the plate.

In this way the free adaptability of the inclination of the cleaning part relative to the handle is assured on the one hand while the rotational position of the cleaning part relative to the longitudinal axis of the handle is retained.

To achieve an even and flat cleaning of the inside surface of the automobile window, in accordance with one embodiment of this invention, means for the removable fastening of the cleaning part in the form of claw-like hooks are distributed over the surface thereof.

BRIEF DESCRIPTION OF THE DRAWINGS

Further advantages of the subject invention will be apparent from the following description in conjunction with the drawings wherein.

DESCRIPTION OF PREFERRED EMBODIMENTS

Figure 1:
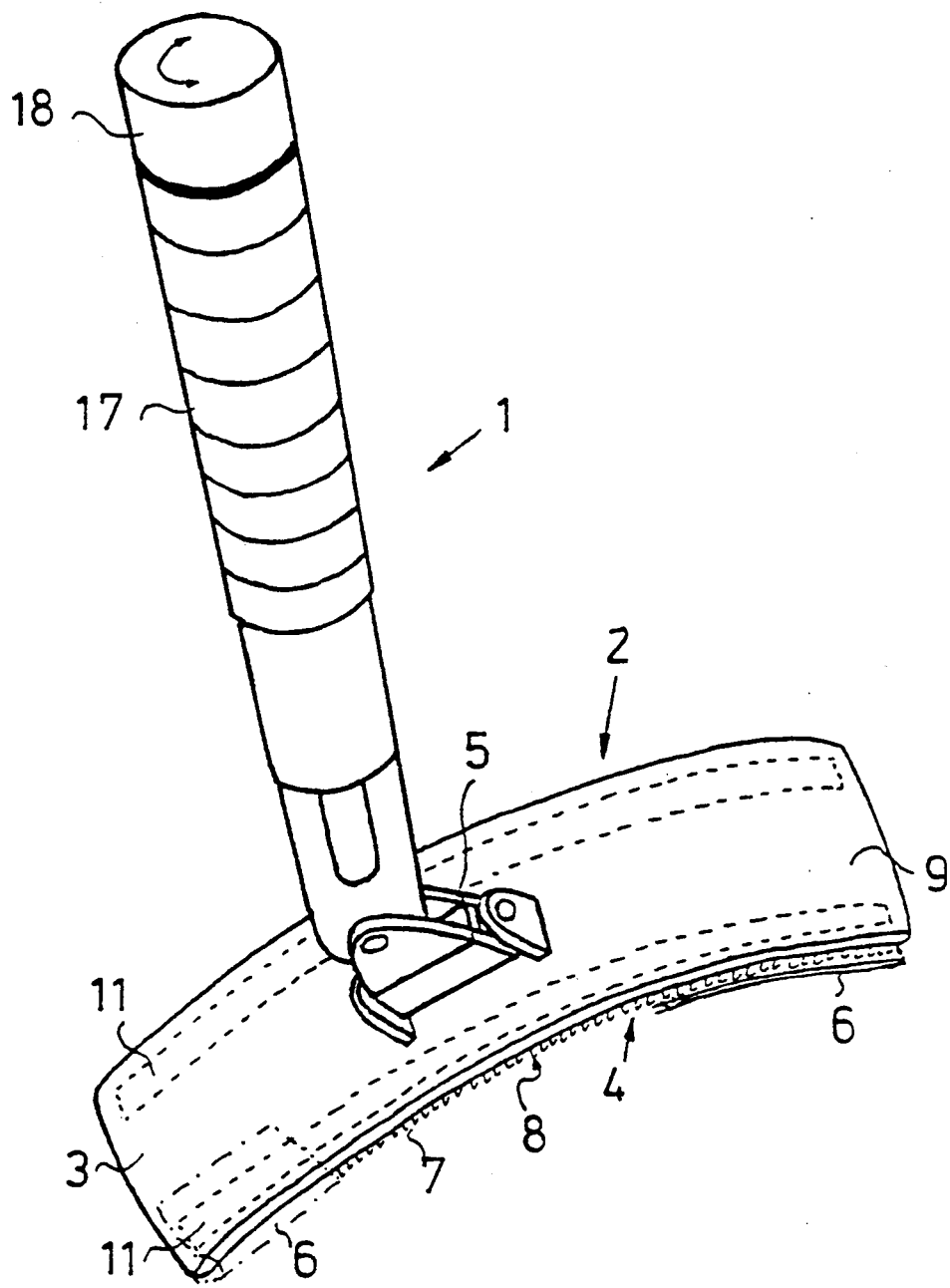
FIG. 1 is a perspective view of the device for cleaning the inside surfaces of the windshield and rear window of an automobile in accordance with one embodiment of this invention.
Figure 2:
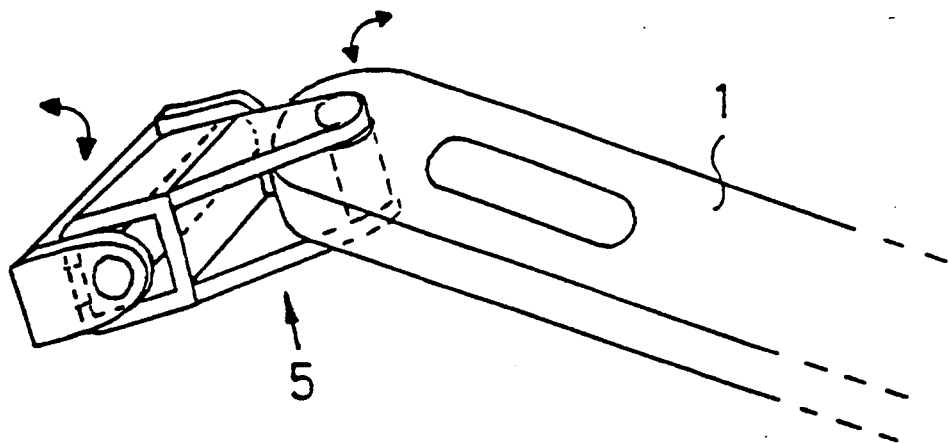
FIG. 2 shows a detail drawing of the hinged connection between the cleaning plate and the handle in accordance with one embodiment of this invention.
Figure 3:
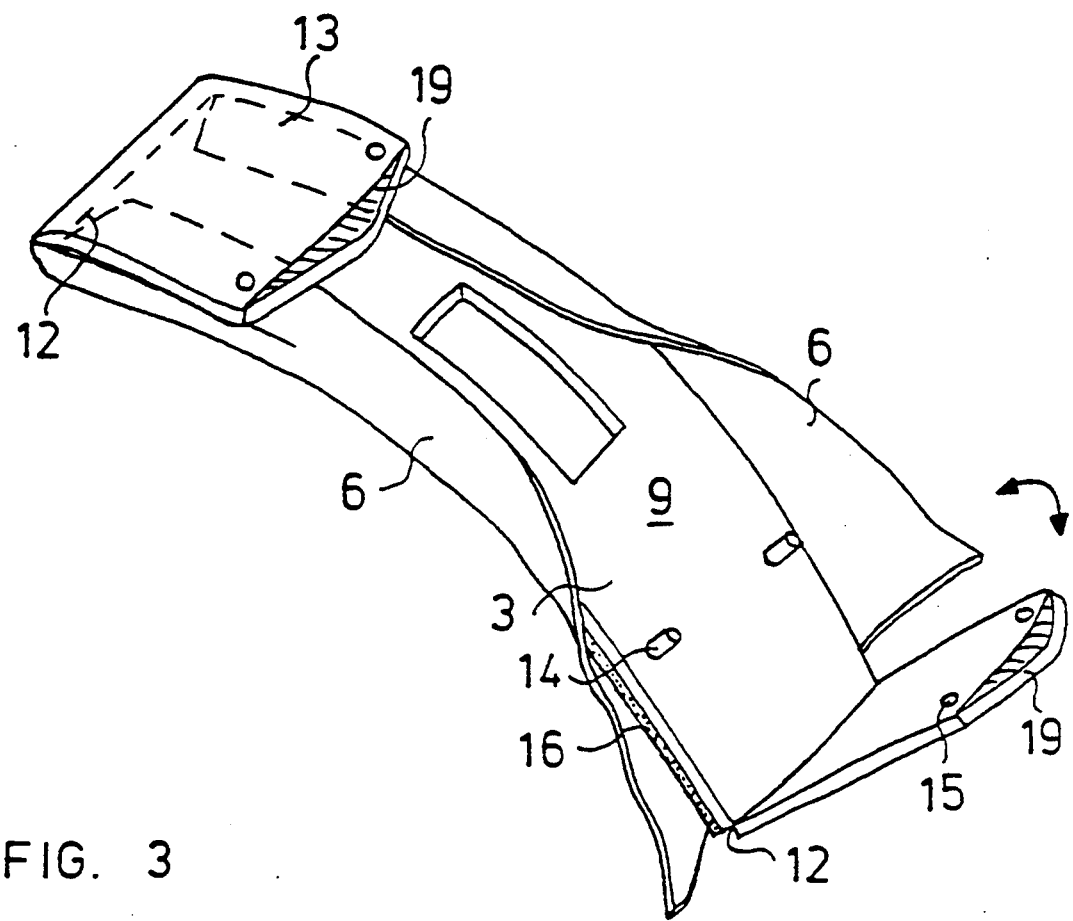
FIG. 3 is a perspective view of a cleaning plate for fastening a cleaning cloth in accordance with one embodiment of this invention.

The device for cleaning the inside surfaces of the windshield and rear window of automobiles in accordance with one embodiment of this invention comprises two parts, namely a handle 1 and a cleaning part 2, which are movably connected to each other by a knuckle joint 5. The cleaning part comprises a plate 3, means 4 for the removable fastening of a cleaning cloth, and the cleaning cloth 6 itself. It is essential for cleaning the windshield, in particular, that the driver can clean it quickly and cleanly using the device of this invention. The exchangeability of the cleaning cloths 6 assures cleanliness. It is essential for quick cleaning that the cleaning part 2 is connected in a limitedly movable manner to the handle 1. This limited mobility is attained with knuckle joint 5. The limited mobility results in the plate 3 being able to adapt to any inclination of the windshield, but not being able to turn arbitrarily around the longitudinal axis of the handle 1. Only in this way is it assured that the entire length of the plate 3 can be utilized during cleaning. In accordance with one embodiment of this invention, the plate 3 has a length of approximately 20 cm and as width of approximately 7 cm. It is made from polypropylene in accordance with a known injection molding process. The knuckle joint 5 is preferably molded directly to the plate 3 as shown in FIG. 1. However, in accordance with another embodiment of this invention, the plate 3 and the handle 1 are manufactured separately and fitted together with the knuckle joint 5, as shown in FIGS. 2 and 3.

The means 4 for the removable connection of a cleaning cloth 6 can be designed in many ways. In accordance with one embodiment as shown in FIG. 1, contact surface 8 of the plate 3 is provided with hooks 7, as they are known from the hook portion of a Velcro closure, over almost the entire surface. These hooks 7 can be made of one piece with the plate 3 by producing the respective injection mold by spark erosion. However, it is also possible to glue an appropriate Velcro part on the entirety of the rigid contact surface 8 of the plate 3. In this case, cleaning cloths 6, which correspond exactly in their size to the size of the plate 3 are preferably used.

In accordance with another embodiment of this invention, strips 11 of a Velcro part are glued only along the long edges of the back 9 of the plate 3. In accordance with this embodiment, cleaning cloth 6 must be wider than the width of the plate 3, so that it can be appropriately turned over, to be held by the strips 11 on the back 9 of the plate 3. So that the cleaning cloth does actually adhere to the hooks 7, it must of course have a corresponding structure. Preferably a cleaning cloth made of a non-woven material is used. Such cleaning cloths are available in various types, in particular those of relatively fluffy materials which are correspondingly absorbent and are offered commercially as wiping cloths. Alternately suitable are cloths of relatively thin fleece which are already saturated with a cleaning agent. If such moist cloths are used, they can be stored in the handle 1, which is designed as a receptacle 17 and can be closed off with a screw cap 18.

In accordance with one embodiment of this invention, plate 3 is provided over the entire contact surface with hooks 7 which themselves act in an elastically resilient manner, so that an appropriate adaptation to the windshield occurs by means of the hooks 7. In accordance with another embodiment where hooks 7 are fastened on the back 8 by strips 11, this elastic adaptation is lacking. Consequently, contact surface 8 is provided with the required elasticity by a cushioning material. Accordingly, the plate 3 is covered over its entire surface with a foam rubber layer 16, preferably a non-absorbent foam rubber. Accordingly, in accordance with one embodiment of this invention, foam rubber 16 is a closed-pore layer of polyurethane foam.

In accordance with another embodiment of this invention, means 4 for removable fastening of the cleaning cloth 6 are designed in a completely different manner as shown in FIG. 3. Here, the plate 3 is provided with foam rubber layer 16 on the contact side. But fastening of the cleaning cloth 6 is accomplished by clamping plates 13. The clamping plates 13 are preferably integral with the plate 3, and have narrow sides pivotably connected to the plate 3 by film hinges 12. Cams 14 are extruded on the back 9 of the plate 3, which fit into corresponding bores 15 in the clamping plates 13. In this way, the cleaning cloth 6 can be draped over the long edges of the plate 3 and covers the cam 14. Thereafter, the clamping plates 13 are pivoted and the cleaning cloth 6 is clamped between the clamping plate 13 and the plate 3 and is additionally held in an interlocking manner by the cam 14 and the bores 15. It is of course possible to sharpen the cams 14 to a point, so that the cleaning cloth 6 is correspondingly pierced by the cam 14. To be able to remove the dirty cleaning cloth 6 after use, it is preferred that the clamping plate 13 has an appropriate, bent-up end 19, which is used as a grip plate.

The adaptability of the plate 3 to the corresponding shape of the windshield is a particularly essential point for flawless cleaning of the curved windshield of an automobile. Contrary to expectations, this is achieved not by adapting the plate 3 as exactly as possible to the shape of the windshield, but rather by designing it contrary to the curvature of the windshield. Thus, contact surface 8 of the plate 3 is curved in such a way that it has a concave, cylindrical bend where the axis of curvature extends at least approximately perpendicularly to the longitudinal axis of the plate. This results in great elasticity of the plate 3 and the use can determine immediately whether sufficient pressure is being exerted on the plate 3. The adaptability and the complete contact of the cleaning cloth 6 with the windshield to be cleaned is therefore not mainly dependent on the thickness of the foam rubber layer 16, but on the flexibility of the plate 3, which is obtained by this appropriate shape. This curvature has been shown greatly exaggerated in the drawing figure for reasons of clarity. This curvature preferably is designed in such a way that the central curvature of the plate is approximately 3 to 6 mm.

I claim:

1. In a device for cleaning a concave inner surface of at least one of a windshield and a rear window of an automobile comprising a cleaning part (2) and a handle (1), said cleaning part (2) connected to said handle (1), the improvement comprising: said cleaning part (2) comprising an exchangeable cleaning cloth (6) and a flexible plate (3), said flexible plate (3) being longitudinally concave on one face and correspondingly convex on the opposite face, said handle (1) connected to a central portion of said convex face by a knuckle joint (5), and said flexible plate (3) further comprising means for removably connecting said exchangeable cleaning cloth (6) to said flexible plate (3).

2. In a device in accordance with claim 1, wherein the means (4) for removably connecting said exchangeable cleaning cloth (6) comprises a plurality of claw-like hooks (7) distributed over at least a portion said concave face (8) of said flexible plate (3).

3. In a device in accordance with claim 2, wherein said claw-like hooks are integral with said flexible plate (3).

4. In a device in accordance with claim 1, wherein said means for removably connecting said exchangeable cleaning cloth (6) comprises hook and loop-type fastening strips (11) affixed to said convex face (9) of said flexible plate (3).

5. In a device in accordance with claim 1, wherein said means for removably connecting said exchangeable cloth (6) comprises a clamping plate (13) hingedly connected to each narrow side of said flexible plate (3) by a film hinge (12), said clamping plates (13) securing said exchangeable cleaning cloth (6) in an interlocking and frictional manner.

6. In a device in accordance with claim 5, wherein the clamping plates (13) each have at least one bore (15), which cooperates with at least one cam (14) for each said bore on said convex face (9) of the flexible plate (3) in the manner of a snap fastener.

7. In a device in accordance with claim 5, wherein said concave face (8) of the flexible plate (3) is cushioned with a foam rubber (16).

8. In a device in accordance with claim 1, wherein the handle (1) is hollow, forming a receptacle (17) for the exchangeable cleaning cloth (6).

* * * * *